United States Patent Office.

IMPROVED COMPOUND FOR LIGHTING CIGARS, &c.

CHARLES J. M. SOHET AND H. C. T. MOLVAUT, OF NEW YORK.

Letters Patent No. 59,868, dated November 20, 1866.

SPECIFICATION.

TO ALL WHOM IT MAY CONCERN:

Be it known that we, CHARLES J. M. SOHET and HENRI C. T. MOLVAUT, of the city, county, and State of New York, have invented a new and improved Chemical Lighting Compound; and we do hereby declare that the following is a full, clear, and exact description thereof, which will enable those skilled in the art to make and use the same.

This powder is intended to be a tobacco lighter, which by its simple contact with or application to the tobacco, will ignite it instantly without flames. The powder will not ignite any other substance, the igniting action being produced at the time that the smoker inhales or aspires the air through the tobacco.

This powder is not hurtful to the lungs, as it evolves or produces no dangerous gases, nor any disagreeable odor, nor any bad taste. All danger of fire and conflagration, or of poisoning, is avoided, giving to it a decided advantage over phosphorus, or other inflammable matters.

This powder is prepared in four successive operations:

First. The preparation of a neutral sulphate of iron as follows: $Fe.O.SO_3 + H.O$, which is obtained by pouring diluted sulphuric acid on iron scrapings; then decant the liquor, evaporate, and let it crystallize. Decimal measures: $Fe.O=25.81$; $SO_3=29.35$; $H.O=44.84$; $Fe.O.SO_3 + H.O=100.00$.

Second. The crystals are collected in a china cup in which water and concentrated nitric acid are thrown in the following proportions: crystals of sulphate of iron, 1.000; water, 1.000; nitric acid, 0.200. Heat to boiling heat till the red vapors cease to rise, let it cool, and mix it with 20 parts of water. In this last liquor throw some ammonia in excess, in order to precipitate all the iron, which is obtained in the state of magnetic iron, $Fe_2.O_3$. In decimals, $Fe_2=40.O_3=60$, or $Fe_2 O_3=100$.

Third. This oxide of iron is reduced ($Fe_2 O_3$) in the following way: It is spread in a thin layer in a china tube, connected at one of its ends with an apparatus producing pure and dry hydrogen, and at its other end with a discharge tube extending under a bell filled with mercury and placed in the pneumatic vessel. The china tube is heated to a degree of dark red heat and the operation is concluded, when instead of water which forms in the mercury tube, the hydrogen gas flows without transformation. The reduced iron is taken out of the china tube and transferred, while yet hot, into vessels filled with hydrogen gas and carefully corked. Its essential property is that it can be immediately and entirely dissolved in sulphuric acid diluted with water, without emanating sulphuric gases.

Fourth. The last operation is as follows: Calcine, in a crucible, sulphate of aluminum and of potash or ordinary alum, (of which the formulæ are: $KO.SO_3 = Al_2 O_3 3SO_3 .24HO$; in decimals $KO=8.24$; $Al_2 O_3=10.82$; $SO_3=33.72$; $24HO=47.22$; $KO.SO_3 .Al_2 .O_3 .SO_3 + 24HO=100.00$,) and some molasses, of which the formula is: $C_{12}.H_{11}.O_{11}$; or, in decimals, $C=42.10$; $H=6.44$; $O=51.46$; or $C_{12}.H_{11}.O_{11}=100.00$. Mix alum and molasses as follows: alum, 3 parts; molasses, 1 part. Calcine this mixture in a covered crucible. This calcination produces sulphide of aluminum and of potassium, perfectly united to a finely divided carbonized molasses.

Lastly, take this mixture and the iron produced by operation No. 3, in equal proportions, and both powders are intimately mixed. Thus the compound is produced, which is put in hermetically sealed vessels, entirely free of access of air.

In the operation of bringing in contact a piece of steel and a piece of flint, the red heat is produced by small particles of steel which heat. But in our powder, steel is replaced by carburetted iron, which is found in the mixture and replaced by the magnetic iron, $Fe_2 O_3$, reduced and mixed with sulphide of aluminum, of potassium, and of finely divided coal, which consequently presents by this union some small parts of great affinity for oxygen.

It will thus be readily understood that when, in lighting a cigar or a pipe, the air is made to pass through the chemical lighting powder, these small parts attract a great quantity of oxygen, and sufficient heat is produced to render the iron red hot; consequently, the tobacco is ignited as it would be with a red-hot piece of iron, and without the use of any kind of fire. In one word, it is similar to a spark which is produced by a piece of steel brought in contact with a flint, and which finds itself fixed. There is, then, no danger whatever of fire, and also no danger whatever of noxious vapors or gases.

We claim as new, and desire to secure by Letters Patent—

A lighting compound made as described.

The above specification of invention, signed by us this 4th day of September, 1866.

CH. JH. Mc. SOHET,
H. C. T. MOLVAUT.

Witnesses:
WM. F. McNAMARA,
ALEX. F. ROBERTS.